United States Patent
Ganapathiappan et al.

(10) Patent No.: US 8,206,496 B2
(45) Date of Patent: Jun. 26, 2012

(54) MIXED PHTHALOCYANINE AND NAPHTHALOCYANINE DYES FOR NEAR-INFRARED APPLICATIONS

(75) Inventors: Sivapackia Ganapathiappan, Los Altos, CA (US); Jayprakash Bhatt, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 396 days.

(21) Appl. No.: 12/564,811

(22) Filed: Sep. 22, 2009

(65) Prior Publication Data

US 2011/0067597 A1 Mar. 24, 2011

(51) Int. Cl.
 *C09D 11/02* (2006.01)
 *C07B 47/00* (2006.01)
 *C07D 487/22* (2006.01)

(52) U.S. Cl. .............. 106/31.49; 540/128; 540/132; 540/139; 540/140

(58) Field of Classification Search ............... 106/31.49; 540/128, 132, 139, 140, 143
See application file for complete search history.

(56) References Cited

U.S. PATENT DOCUMENTS

| | | | | |
|---|---|---|---|---|
| 5,087,390 A * | 2/1992 | Sounik et al. | ............... | 540/139 |
| 5,633,370 A * | 5/1997 | Shirai et al. | ................... | 540/139 |
| 5,824,799 A * | 10/1998 | Buechler et al. | ............. | 540/128 |
| 5,889,181 A * | 3/1999 | Kudrevich et al. | ............ | 540/140 |
| 8,029,611 B2 * | 10/2011 | Vonwiller et al. | .......... | 106/31.49 |

* cited by examiner

*Primary Examiner* — Helene Klemanski
(74) *Attorney, Agent, or Firm* — David W. Collins

(57) ABSTRACT

Mixed phthalocyanine and naphthalocyanine water-soluble dyes with near-infrared absorption comprise four isoindole units linked together in a large ring to form a phthalocyanine macrocycle. At least one benzene ring is linked to an isoindole unit and at least one naphthalene ring is linked to another isoindole unit. The remaining two isoindole units each have a benzene ring or a naphthalene ring linked thereto, in any combination. A metal atom is optionally complexed to the phthalocyanine macrocycle.

9 Claims, No Drawings

MIXED PHTHALOCYANINE AND NAPHTHALOCYANINE DYES FOR NEAR-INFRARED APPLICATIONS

BACKGROUND ART

Inkjet printers are now very common and affordable and allow one to obtain decent print quality. They are used in home printing, office printing and commercial printing. In inkjet printers, print heads are used to eject ink droplets very accurately to place them on a desired location on a medium. The print head normally comprises a large number of nozzles, often, more than 400 nozzles. As a general rule, the larger the number of nozzles, the greater is the improvement of the print quality and speed. Frequently, the nozzles become blocked because of the usage of pigmented inks or inks containing particles. Sometimes, one or more nozzle orifices may contain dried ink and fresh ink cannot be ejected. One result of this condition is the formation of streaks, which lead to poor print quality.

Near-infrared (near-IR) absorbing dyes may be added to the ink to monitor the condition of the nozzles. Incorporation of near-IR dyes enables detection of ink ejected by the print head. The detection system attached to the printer always monitors the nozzle health. If the nozzle is clogged, it allows other nozzles to spit the ink on the same spot. Near-infrared materials enable continuous monitoring of nozzles and correcting for clogged nozzles. This ensures consistent high print quality over the life of the printer. This is especially important for newer inkjet printers with permanent print heads. High print quality throughout the life of a permanent print head is a major customer benefit.

Other applications for such dyes exhibiting absorption in the near-IR include security printing, RFID tags, etc. Near-IR absorbing dyes may be employed by extending the conjugation so that the absorption can be shifted to the range of 700 to 1000 nm range.

Many of the technologies utilizing near-IR materials require that these materials be dissolved in organic solvents, water and aqueous or organic solvent blends. Some applications, such as thermal inkjet printing, require that the near-IR absorbing material be kept in aqueous solution for long periods of time. Near-IR dyes have to be stable in aqueous solvent blends for a long time without undergoing any kind of chemical change. Any degradation or change to its physical/chemical nature can destroy the conjugation and thus lose the near-IR absorption. Such changes could adversely affect the desired property (absorption in the near-IR wavelength range) and prevent use in such applications.

Near-IR dyes of the Cyanine dye class are soluble in water but are chemically unstable in aqueous solutions over a long time at wide pH range and are therefore not suitable for inkjet applications requiring aqueous solution stability for long periods of time.

Phthalocyanine (PC) and naphthalocyanine (NPC) (metal free or metal complex) are chemically stable but are difficult to solubilize in water. Highly ionic groups or water-soluble ethylene oxide groups have to be attached for dissolving these compounds in water. These compounds are solubilized by attaching water-soluble groups on the benzene rings. But introduction of such groups changes the peak absorption dramatically up to 60 nm.

BEST MODES FOR CARRYING OUT THE INVENTION

Before the present invention is disclosed and described, it is to be understood that this invention is not limited to the particular process steps and materials disclosed herein because such process steps and materials may vary somewhat. It is also to be understood that the terminology used herein is used for the purpose of describing particular embodiments only. The terms are not intended to be limiting because the scope of the present invention is intended to be limited only by the appended claims and equivalents thereof.

It must be noted that, as used in this specification and the appended claims, the singular forms "a," "an," and "the" include plural referents unless the context clearly dictates otherwise.

As used herein, "vehicle" or "liquid vehicle" is defined to include liquid compositions that can be used to carry colorants to a substrate. Liquid vehicles are well known in the art, and a wide variety of ink vehicles may be used in accordance with embodiments of the present invention. Such ink vehicles may include a mixture of a variety of different agents, including without limitation, surfactants, organic solvents and co-solvents, buffers, biocides, viscosity modifiers, sequestering agents, stabilizing agents, anti-kogation agents, and water. Though not part of the liquid vehicle per se, in addition to the colorants, the liquid vehicle can carry solid additives such as polymers, latexes, UV curable materials, plasticizers, salts, etc. As such, the term "aqueous liquid vehicle" or "aqueous vehicle" refers to a liquid vehicle having water as a major solvent, and often, a predominant solvent.

The term "near infrared" or "near-IR" refers to optical radiation in the range of about 700 nm to 1400 nm. In accordance with embodiments of the present invention, the near-IR dyes of the present disclosure can absorb optical radiation within the near-IR spectrum, and in one embodiment, in the 700 nm to 1000 nm range.

As used herein, "colorant" can include dyes, pigments, and/or other particulates that may be suspended or dissolved in an ink vehicle prepared in accordance with embodiments of the present invention. Dyes are typically water-soluble, and therefore, can be desirable for use in many embodiments. However, pigments can also be used in other embodiments. Pigments that can be used include self-dispersed pigments and polymer dispersed pigments. Self-dispersed pigments include those that have been chemically surface modified with a charge or a polymeric grouping. This chemical modification aids the pigment in becoming and/or substantially remaining dispersed in a liquid vehicle. The pigment can also be a polymer-dispersed pigment that utilizes a dispersant (which can be a polymer, an oligomer, or a surfactant, for example) in the liquid vehicle and/or in the pigment that utilizes a physical coating to aid the pigment in becoming and/or substantially remaining dispersed in a liquid vehicle. It is noted that the term "colorant" does not include the near-IR dyes described in accordance with embodiments of the present disclosure, e.g., near-IR dyes generally described in Formulae (I)-(IV) or specifically described in Formulae (V)-(VI) below.

The term "about" when referring to a numerical value or range is intended to encompass the values resulting from experimental error that can occur when taking measurements.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Numerical values, such as ratios, concentrations, amounts, molecular sizes, etc., may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight range of about 1 wt % to about 20 wt % should be interpreted to include not only the explicitly recited concentration limits of 1 wt % to about 20 wt %, but also to include individual concentrations such as 2 wt %, 3 wt %, 4 wt %, and sub-ranges such as 5 wt % to 15 wt %, 10 wt % to 20 wt %, etc.

As indicated above, current near-IR absorbing compounds are either not soluble in water or not very stable in water or inks. Methods for making such compounds are also difficult. In accordance with the teachings herein, the synthesis of near-IR absorbing compounds that are water-soluble or dispersed and that are very stable in water and other solutions such as inkjet ink formulation with a wide range of pH is improved. Only a small quantity has to be used for the desired application as these compounds exhibit very strong absorption in the near-IR region. These compounds are very soluble because of the presence of water-soluble group(s) such as sulfonates or ethylene oxides on the benzene rings or in the axial position of the central metal atom. Other water solubilizing groups are phosphates, sulfates, ammonium salts, amides, ethylene oxides, propylene oxides, ethylene sulfide, and propylene sulfide. Moreover, these compounds are also very stable because of the rigid PC and NPC ring network.

A phthalocyanine is a macrocyclic compound having an alternating nitrogen atom-carbon atom ring structure. The molecule is able to coordinate hydrogen and metal cations in its center by coordinate bonds with the four pyrrole nitrogen atoms. Thus, the phthalocyanines contain four pyrrole units linked together in a large ring (macrocycle). The central atoms can carry additional ligands. Most of the elements of the Periodic Table have been found to be able to coordinate to the phthalo-cyanine macrocycle. Therefore, a variety of phthalocyanine complexes exist.

Where the phthalocyanine compound includes a benzene ring fused to each of the pyrrole units, a naphthalocyanine compound includes a naphthalene ring fused to each of the pyrrole units.

In accordance with embodiments of the teachings herein, mixed phthalocyanine and naphthalocyanine dyes are provided. The mixed phthalocyanine and naphthalocya-nine water-soluble dyes with near-infrared absorption comprise four pyrrole units linked together in a large ring, with at least one benzene ring linked to an isoindole a pyrrole unit and at least one naphthalene ring linked to another pyrrole unit. The remaining two pyrrole units may each have a benzene ring or a naphtha-lene ring linked thereto, in any combination. If there are two benzene rings and two naphthalene rings in the compound, they may be disposed either symmetrically or asymmetrically. The compound may have a metal atom optionally complexed to the phthalocyanine macrocycle.

General structures of water soluble dyes are disclosed here wherein mixed benzene and naphthalene rings are present in the phthalocyanines as shown in Formulae (I)-(IV) below.

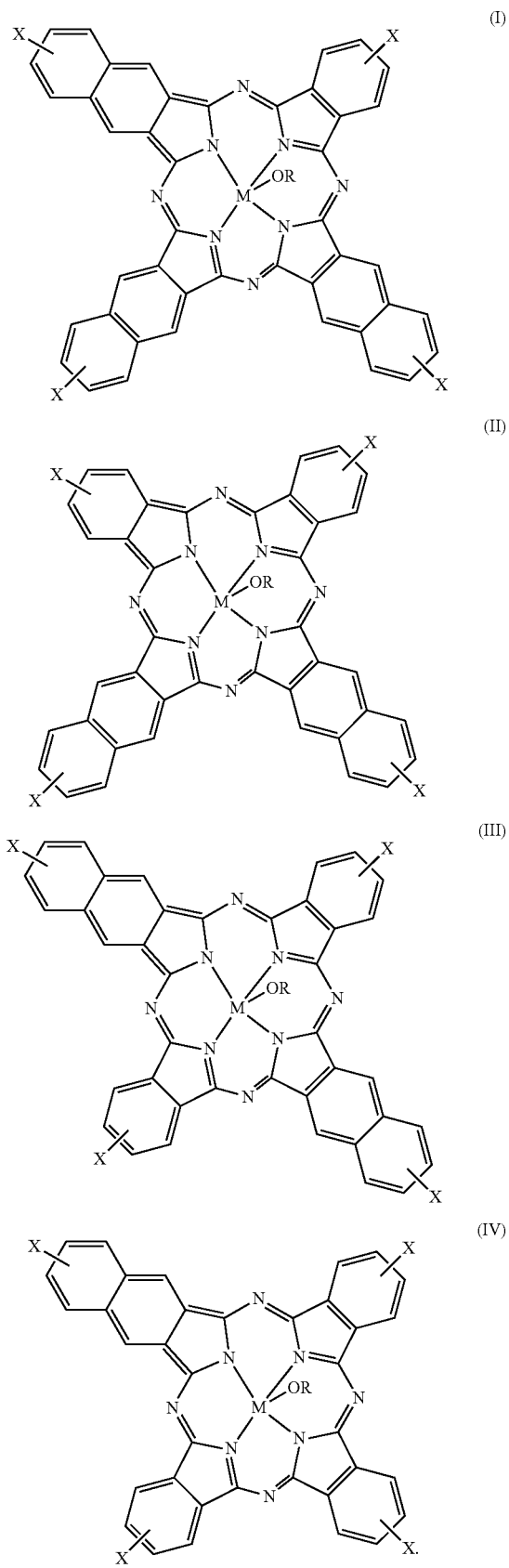

In these compounds:
- R is any monovalent group, for example H, alkyl or substituted alkyl, acetyl, acetylacetonyl, —SO$_3$—Z, —PO$_3$—Z, where Z is Na$^+$, K$^+$, or NH$_4^+$, or ethylene glycolic units with molecular weight 45 to 100,000 (e.g., (C$_2$H$_4$O)$_m$CH$_3$, where m is 1 to 1000);
- M can be any metal of the Periodic Table, for example copper, titanium, vanadium, manganese, iron, nickel, cobalt, indium, tin, gallium, scandium, yttrium, silicon, and germanium;
- the number of OR groups depends up on the valency of the metal atom—if the valency of metal M is three, then one OR group is present, while if the valency of metal M is four, then two OR groups is present;
- X is independently selected from any monovalent group such as H, alkyl or substituted alkyl, —SO$_3$—Na, —SO$_3$—K, —SO$_3$—Z, —PO$_3$—Z, —NR$_4^+$, —(CH$_2$CH$_2$O)$_n$CH$_3$, where n=1 to 500 and Z=H, monovalent metal ion (e.g. Na$^+$, K$^+$), or NR$_4^+$.

For improved water solubility, at least one —SO$_3$—Na group is present on the ring. But the same group can be replaced with other groups such as —OH, —OCOR; —COOZ, —SO$_3$Z, —PO$_3$Z, —NR$_4^+$, —O(CH$_2$CH$_2$O)$_n$CH$_3$ (n=1 to 500) (Z=H, monovalent metal ions (e.g., Na$^+$, K$^+$) or NR$_4^+$) to have the same solubility.

The mixed phthalocyanine and naphthalocyanine compounds are water-soluble or dispersible in aqueous solutions or aqueous blend solutions and stable over a wide pH range. The presence of mixed substituents disturbs the symmetry of phthalocyanines, consequently increasing the extinction coefficient.

In addition, they also extend the visible absorption of phthalocyanines to the near-infrared range. This increase enables the use of smaller quantities for the desired application and reduces the cost of the ink. These dyes exhibit absorptions in the near-infrared range from 700 to 1000 nm. The dyes find applications in a wide variety of fields, including security applications, printing, print authenticity, special media, RFID tags etc.

Phthalocyanines (PC) (metal free or metal complex) are chemically stable and are known as pigment/dyes with visible absorption range. They find applications in a variety of fields. They also have high extinction coefficient. For near-IR applications, naphthalocyanine (NPC) are known but their extinction coefficient is low compared to phthalocyanines. In order to have very high extinction coefficient, phthalocyanine structure has to be adopted, yet they have to have absorption in the near-IR range. Several pigments/dyes known have mainly copper, titanium, cobalt, manganese, vanadium, and silicon. But certain elements such as indium, yttrium or scandium as central metal atoms shift the wavelength to near-IR range. In another embodiment, the metal can be absent to have metal-free dyes also. Highly polar groups like sulfonates, phosphates or water-soluble ethylene oxide/propylene oxide groups have to be attached for dissolving these compounds in water. These dyes are chemically stable in water as well as aqueous solvent blends at wide pH range and are best suited for water-based inkjet ink applications.

These dyes may be prepared from the corresponding 1,2-dicyanobenzene and 2,3-dicyanonaphthalene compounds in the desired stoichiometry with metallic compounds such as indium chloride, copper chloride, yttrium chloride, gallium chloride or scandium chloride. In the above compounds chloride can be substituted with acetates, other halides or acetylacetonates. After obtaining the desired mixed phthalo/naphthalocyanine with mixed benzene and naphthalene groups, they are sulfonated with fuming sulfuric acid and then the water soluble sulfonic acid obtained was neutralized with base such as sodium carbonate to obtain the sodium salt. Sodium carbonate salt can be replaced with potassium carbonate to obtain the corresponding potassium ions. The presence of central metals such as indium, yttrium, gallium and scandium increases the wavelength of absorption to greater than 750 nm.

These dyes are also expected to exhibit very high extinction coefficient so that only small quantity (in the range of 0.0001 to 3% in the ink; see below for a further discussion of the extinction coefficient) can be used for the desired applications. Some examples for these compounds are shown in Formulae (V) and (VI) below.

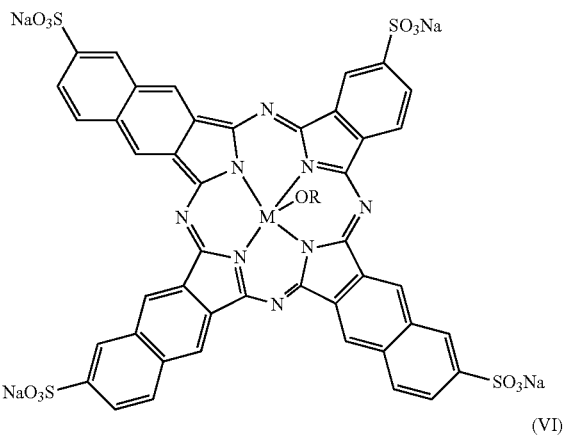

(V)

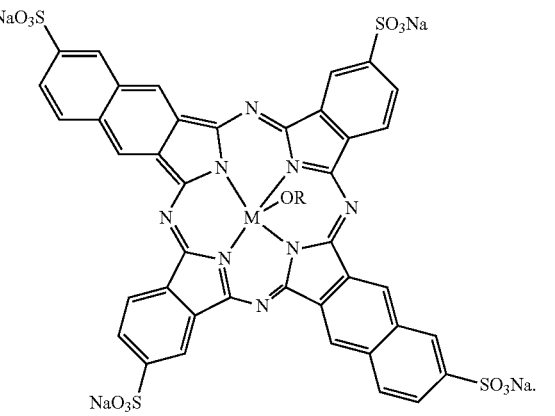

(VI)

Formulae (V) and (VI) depict the general structure of phthalocyanine sulfonates with mixed benzene and naphthalene groups, in which M=In and R=H or SO$_3$—Na.

Different isomers are possible with the presence of both benzene and naphthalene rings as well as with the position of sulfonate groups. In some embodiments, more than one sulfonate group can be present on the benzene or naphthalene rings.

Considerations Relating to Inks

In addition to the near-infrared absorbing compounds described herein as well as the inks containing such compounds, the present disclosure provides a method of printing such compounds and inks. In one embodiment, a method of printing any of the near-infrared absorbing compounds described herein can comprise printing an ink-jet ink containing the near-infrared absorbing compound with an ink-jet printer.

Generally, ink-jet printers contain ink-jet ink print heads that are used to eject ink droplets accurately at precise locations on print media. As such, ink-jet printers can contain from several nozzles in the print head to more than 400 nozzles. A high population of nozzles can increase the print quality and speed of the ink-jet printing. However, frequently, the nozzles get blocked because of the usage of pigmented inks or inks containing particles, such as binders, resins, latexes, etc. As such, streaks can occur, which leads to poor print quality. As such, ink-jet printers having near-infrared absorbing compounds in the ink-jet ink can be coupled to a detection system used to monitor nozzle health. Generally, the detection system monitors the ink ejected from the nozzles by detecting the near-infrared absorbing compound in the ink-jet ink. If the detection system fails to detect the near-infrared absorbing compound, the printer can ascertain that such nozzle is blocked or otherwise faulty and adjust the printing by using a different nozzle(s), thereby maintaining print quality and performance.

Additionally, the present ink-jet inks can provide security features. The present near-infrared absorbing compounds can be tailored to absorb specific wavelengths. Once an ink-jet ink has been manufactured with a near-infrared absorbing compound described herein, such an ink can be characterized by determining the absorption of the ink in the near-infrared wavelength region. After such information is determined and catalogued, the ink-jet ink can be printed and subsequently verified for its particular absorption. The ink could then be used to determine the authenticity of the print, especially, for example, high priced museum quality art prints.

Additionally, the present near-infrared absorbing compounds can provide increased stability by increasing the extinction coefficient of the near-infrared absorbing compounds. As such, the present near-infrared absorbing compounds allow for an ink-jet ink formulation having a smaller quantity of the near-infrared absorbing compounds, leading to lower production costs.

The inks of the present disclosure can be used with commercially available ink-jet printers, such as DESKJET® or PHOTOSMART® and other similar printers manufactured by Hewlett-Packard Company. It is notable that these inks are acceptable for use with both thermal ink-jet ink printers and piezo ink-jet printers. They can also be used with off-axis printers, which have a high demand with respect to maintaining a reliable ink with low incidences of clogging. Further, these ink sets can produce true colors on a variety of media, including uncoated media, clay coated media, inorganic porous coated media, e.g., silica- and alumina-based media, and organic swellable media, e.g., gelatin coated media, each with improved light fastness, gamut, and other print quality enhancements.

As previously discussed, the inks of the present invention can include a colorant in the form or a dye and/or pigment. In one embodiment, the ink can be a cyan ink, magenta ink, yellow ink, pale cyan ink, pale magenta ink, green ink, blue ink, orange ink, pink ink, gray ink, etc. Additionally, multiple inks can be used to form an ink set for use with the printers described herein. As such, a printer can have from one to multiple dyes in a single ink, each having more than one dye load, and/or multiple dyes in over an ink set. Some or all of the inks in an ink set can additionally include the near-IR dyes described herein, or an ink might include a near-IR dye described herein without the presence of another colorant. The typical colorant range is about 0.1% to 6% by weight of the total ink composition.

A typical liquid vehicle formulation that can be used with a dye set of the present invention can include one or more organic co-solvent(s), present in total at from 5.0% to 50.0% by weight, and one or more non-ionic, cationic, and/or anionic surfactant(s), present from 0.01% to 10.0% by weight. The balance of the formulation can be purified water, or other vehicle components known in the art such as biocides, viscosity modifiers, pH adjusting agents, sequestering agents, preservatives, anti-kogation agents, bleed control agents, drying agents, jettability agents, and the like.

The concentration of the PC and NPC dyes disclosed herein for use in the foregoing typical formulation ranges from about 0.0001% to 3% by weight of the ink, in addition to colorant (dyes and/or pigments) described above. In some embodiments, the concentration of the PC and NPC dyes may range from about 0.005% to 0.5% by weight of the ink. The concentration of the PC and NPC dyes depends on the extinction coefficient of the dye for detection. If the extinction coefficient of the PC or NPC dye is comparatively high, then a lower dye concentration may be employed and vice versa.

It will be appreciated that some phthalocyanine and naphthalocyanine dyes may have lower extinction coefficient and therefore may need higher concentration in the ink. Some unique applications may also require use of higher concentration of phthalocyanine and naphthalocyanine dyes in the ink.

Classes of co-solvents that can be used can include aliphatic alcohols, aromatic alcohols, diols, glycol ethers, polyglycol ethers, caprolactams, form amides, acetamides, and long chain alcohols. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted form amides, both substituted and unsubstituted acetamides, and the like. Specific examples of solvents that can be used include 2-pyrrolidinone, derivatized 2-pyrrolidinone including 1-(2-hydroxyethyl)-2-pyrrolidinone, 2-methyl-1,3-propanediol, tetraethylene glycol, and ethylhydroxypropanediol (EHPD), to name a few.

One or more of many surfactants can also be used as are known by those skilled in the art of ink formulation and may be alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and the like. Specific examples of preferred surfactants for use include SOLSPERSE, TERGITOL, DOWFAX, and the like. The amount of surfactant added to the formulation, if included, may range from 0.01% to 10.0% by weight.

Consistent with the formulation of this invention, various other additives may be employed to optimize the properties of the ink composition for specific applications. Examples of these additives are those added to inhibit the growth of harmful microorganisms. These additives may be biocides, fungicides, and other anti-microbial agents, which are routinely used in ink formulations. Examples of suitable microbial agents include, but are not limited to, NUOSEPT, UCARCIDE, VANCIDE, PROXEL, and combinations thereof.

Sequestering agents, such as EDTA (ethylenediaminetetraacetic acid), may be included to eliminate the deleterious effects of metal impurities. Such sequestering agents, if present, typically comprise from 0.01 wt % to 2 wt % of the ink-jet ink compositions. Viscosity modifiers may also be present, as well as other additives known to those skilled in the art to modify properties of the ink as desired. Such additives can be present in the ink-jet ink compositions at from 0 wt % to 20 wt %.

Various buffering agents or pH adjusting agents can also be optionally used in the ink-jet ink compositions of the present invention. Typical pH adjusting agents include such pH control solutions as hydroxides of alkali metals and amines, such as lithium hydroxide, sodium hydroxide, potassium hydroxide; citric acid; amines such as triethanolamine, diethanolamine, and dimethylethanolamine; hydrochloric acid; and other basic or acidic components. If used, pH adjusting agents typically comprise less than about 10 wt % of the ink-jet ink composition. Similarly, buffering agents can be used such as, but not limited to, TRIS, MOPS, citric acid, acetic acid, MES, etc. If used, buffering agents typically comprise less than about 3 wt % of the ink-jet ink composition and generally from about 0.01 wt % to 2 wt %, most commonly from 0.2 wt % to 0.5 wt %. Additionally, anti-kogation agents that can be used include lithium phosphate, sodium phosphate, phosphate esters of fatty alcohol alkoxylates, and the like, in amounts from about 0.01 wt % to 5 wt %.

To further illustrate embodiment(s) of the present disclosure, the following examples are given herein. It is to be understood that these examples are provided for illustrative purposes and is not to be construed as limiting the scope of the disclosed embodiment(s).

EXAMPLES

Example 1

Mixed Phthalo/Naphthalocyanine Compound of Formula I

To make the mixed phthalo/naphthalocyanine compound of Formula I, 1,2-dicyanobenzene (0.64 g) and 2,3-dicyanonaphthalene (2.7 g) are mixed in 2 ml of dimethylformamide and heated to 180° C. When the temperature reaches 100° C., 1.2 g of indium chloride and 0.05 g of ammonium molybdate are added. The mixture is heated up to 3 hours. The reaction mixture is cooled and washed with isopropanol. The product obtained from the isopropanol-washed mixture is sulfonated with 21 ml of fuming sulfuric acid having 20% sulfur trioxide content. The sulfonated mixture is stirred at ambient temperature under nitrogen for 24 h and then poured in crushed ice. The sulfonated mixture is washed with cold water to remove excess sulfuric acid. The washed mixture is neutralized with 50% sodium carbonate solution to a pH of 7.5. The product after sulfonation is readily soluble in water. The product obtained is a mixed indium phthalo/naphthalocyanine sulfonate of Formula I with sodium ions as counter-ions.

Example 2

Mixed Phthalo/Naphthalocyanine Compound of Formula IV

To make the mixed phthalo/naphthalocyanine compound of Formula IV, 1,2-dicyanobenzene (1.92 g) and 2,3-dicyanonaphthalene (0.9 g) are mixed in 2 ml of dimethylformamide and heated to 180° C. When the temperature reaches 100° C., 1.2 g of indium chloride and 0.05 g of ammonium molybdate are added. The mixture is heated up to 3 hours. The reaction mixture is cooled and washed with isopropanol. The product obtained from the isopropanol-washed mixture is sulfonated with 25 ml of fuming sulfuric acid having 20% sulfur trioxide content. The sulfonated mixture is stirred at ambient temperature under nitrogen for 24 h and then poured in crushed ice. The sulfonated mixture is washed with cold water to remove excess sulfuric acid. The washed mixture is neutralized with 50% sodium carbonate solution to a pH of 7.5. The product after sulfonation is readily soluble in water. The product obtained is a mixed indium phthalo/naphthalocyanine sulfonate of Formula IV with sodium ions as counter-ions.

What is claimed is:

1. Mixed phthalocyanine and naphthalocyanine water-soluble dyes with near-infrared absorption comprising four pyrrole units linked together in a large ring to form a phthalocyanine macrocycle, with at least one benzene ring linked to a pyrrole unit and with at least one naphthalene ring linked to another pyrrole unit, and further with the remaining two pyrrole units each having a benzene ring or a naphthalene ring linked thereto, in any combination, and a metal atom optionally complexed to the phthalocyanine macrocycle, wherein the mixed phthalocyanine and naphthalocyanine water-soluble dyes have a formula selected from Formulae (V) and (VI):

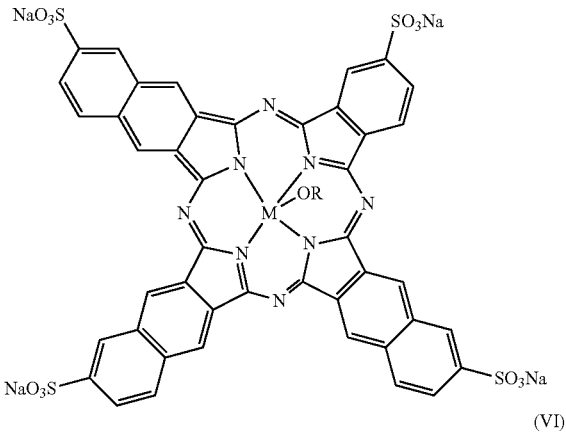

(V)

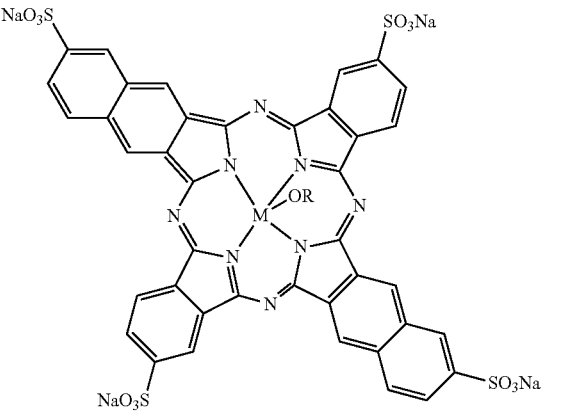

(VI)

wherein:
R is any monovalent group;
M is any metal of the Periodic Table or metal-free; and
the number of OR groups depends up on the valency of the metal atom.

2. The dye of claim 1 wherein M=In and R=H or —SO$_3$—Na.

3. An inkjet ink formulation comprising:
(a) an aqueous vehicle;
(b) at least one dye or pigment; and
(c) at least one mixed phthalocyanine and naphthalocyanine water-soluble dye with near-infrared absorption, the dye with near-infrared absorption comprising four pyrrole units linked together in a large ring to form a phthalocyanine macro-cycle, with at least one benzene ring linked to a pyrrole unit and with at least one naphthalene ring linked to another pyrrole unit, and further with the remaining two pyrrole units each having a benzene ring or a naphthalene ring linked thereto, in any combination, and a metal atom optionally complexed to the phthalocyanine macrocycle.

4. The inkjet ink of claim 3 wherein the mixed phthalocyanine and naphthalocyanine water-soluble dyes have a formula selected from Formulae (I)-(IV):

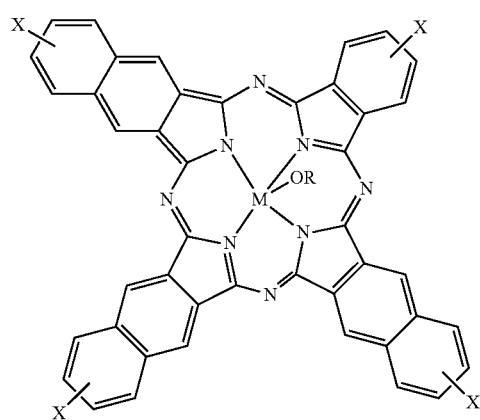
(I)

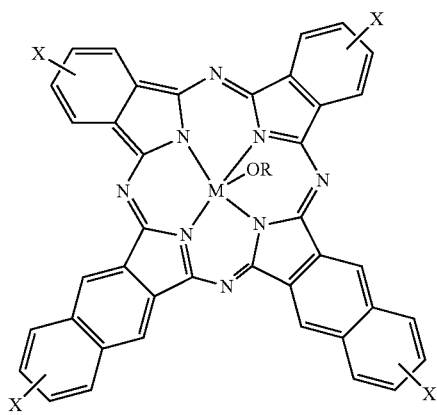
(II)

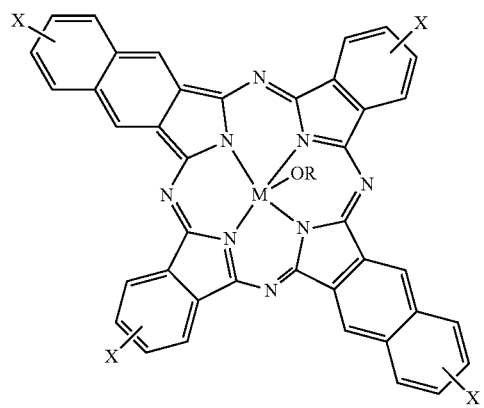
(III)

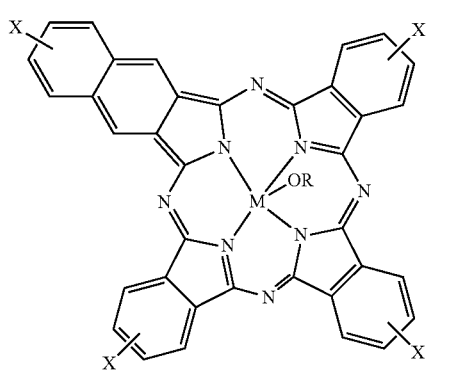
(IV)

wherein:
R is any monovalent group;
M is any metal of the Periodic Table or metal-free;
the number of OR groups depends up on the valency of the metal atom; and
X is independently selected from any monovalent group.

5. The inkjet ink of claim 4 wherein:
R is H, alkyl or substituted alkyl, acetyl, acetylacetonyl, —$SO_3$—Z, —$PO_3$—Z, where Z is $Na^+$, $K^+$, or $NH_4^+$, or ethylene glycolic units with molecular weight 45 to 100,000;
M is selected from the group consisting of copper, titanium, vanadium, manganese, iron, nickel, cobalt, indium, tin, gallium, scandium, yttrium, silicon, and germanium;
X is H, alkyl or substituted alkyl, —$SO_3$—Z, —$PO_3$—Z, or —$(CH_2CH_2O)_n$—$CH_3$, where n=1 to 500 and Z=H, $Na^+$, $K^+$, or $NR_4^+$.

6. The inkjet ink of claim 2 wherein at least one —$SO_3$—Na group is present on any one of the rings for improved water solubility.

7. The inkjet ink of claim 4 wherein at least one —$SO_3$—Na group is replaced with a group selected from the group consisting of —OH, —OCOR; —COOZ, —$SO_3Z$, —$PO_3Z$, —$NR_4^+$, and —$O(CH_2CH_2O)_nCH_3$, where n=1 to 500 and Z=H, $Na^+$, $K^+$, or $NR_4^+$, to have essentially the same water solubility.

8. The inkjet ink of claim 4, selected from the group consisting of Formula (V) and Formula (VI):

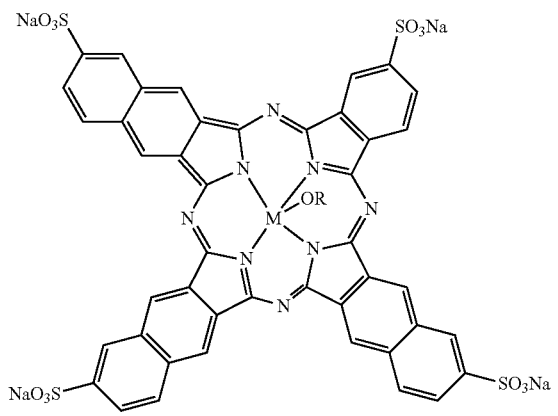
(V)
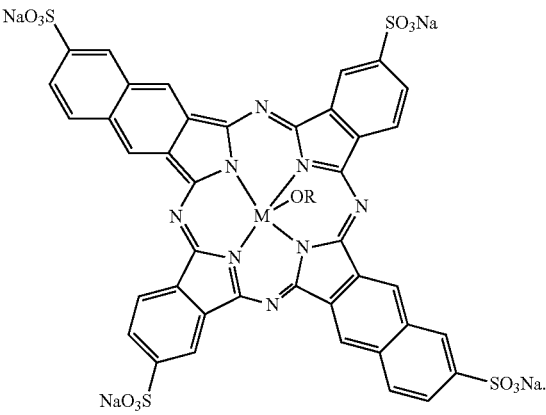
(VI)
9. The inkjet ink of claim 8 wherein M=In and R=H or —SO₃—Na.
* * * * *

UNITED STATES PATENT AND TRADEMARK OFFICE
CERTIFICATE OF CORRECTION

PATENT NO.         : 8,206,496 B2
APPLICATION NO.    : 12/564811
DATED              : June 26, 2012
INVENTOR(S)        : Sivapackia Ganapathiappan et al.

It is certified that error appears in the above-identified patent and that said Letters Patent is hereby corrected as shown below:

In column 3, line 57, after "linked to" delete "an isoindole".

In column 10, line 64, in Claim 1, delete "up on" and insert -- upon --, therefor.

In column 10, line 66, in Claim 2, delete "M=In and R=H" and insert -- M=In and R=H --, therefor.

In column 11, line 10, in Claim 3, delete "macro-cycle," and insert -- macrocycle, --, therefor.

In column 12, line 38, in Claim 4, delete "up on" and insert -- upon --, therefor.

In column 12, line 54, in Claim 5, delete "Z=H," and insert -- Z=H, --, therefor.

In column 12, line 56, in Claim 6, delete "claim 2" and insert -- claim 4 --, therefor.

In column 12, line 59, in Claim 7, delete "claim 4" and insert -- claim 6 --, therefor.

In column 12, line 64, in Claim 7, delete "Z=H," and insert -- Z=H, --, therefor.

In column 14, line 20, in Claim 9, delete "M=In and R=H" and insert -- M=In and R=H --, therefor.

Signed and Sealed this
Twenty-second Day of January, 2013

David J. Kappos
*Director of the United States Patent and Trademark Office*